(12) United States Patent
Abe et al.

(10) Patent No.: US 8,548,309 B2
(45) Date of Patent: *Oct. 1, 2013

(54) PLAYBACK APPARATUS

(75) Inventors: Tatsuro Abe, Ome (JP); Kuniaki Takahashi, Fukaya (JP); Tatsuhiko Ikehata, Ome (JP); Shiro Nagaoka, Ome (JP); Kei Tashiro, Ome (JP); Tsuyoshi Hagiwara, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 460 days.

This patent is subject to a terminal disclaimer.

(21) Appl. No.: 12/896,109

(22) Filed: Oct. 1, 2010

(65) Prior Publication Data
US 2011/0019979 A1    Jan. 27, 2011

Related U.S. Application Data

(62) Division of application No. 11/514,967, filed on Sep. 5, 2006, now Pat. No. 7,831,129.

(30) Foreign Application Priority Data

Sep. 16, 2005  (JP) .................................. 2005-271084

(51) Int. Cl.
*H04N 5/783* (2006.01)
*H04N 5/77* (2006.01)

(52) U.S. Cl.
USPC .......................................... 386/343; 386/224

(58) Field of Classification Search
USPC .................. 386/343, 345, 347, 350, 351, 353
See application file for complete search history.

(56) References Cited

U.S. PATENT DOCUMENTS

| 5,140,437 | A | * | 8/1992 | Yonemitsu et al. ........... 386/329 |
| 5,377,051 | A | | 12/1994 | Lane et al. |
| 5,703,996 | A | | 12/1997 | Omura et al. |
| 2006/0029364 | A1 | | 2/2006 | Kosugi |

FOREIGN PATENT DOCUMENTS

| JP | 11-213521 | 8/1999 |
| JP | 2000-115707 | 4/2000 |
| JP | 2002-034001 | 1/2002 |
| JP | 2002-199345 | 7/2002 |

OTHER PUBLICATIONS

Instruction manual "DVD video recorder of product No. DMR-E500H" Matsushita Electric Industrial Co., Ltd., 2004, pp. 46-51.

* cited by examiner

*Primary Examiner* — Robert Chevalier
(74) *Attorney, Agent, or Firm* — Pillsbury Winthrop Shaw Pittman, LLP (57) ABSTRACT

According to one embodiment, a capturing apparatus includes a capturing unit configured to capture a moving image video, a storage unit configured to store the moving image video captured by the capturing unit, an operation unit configured to include a plurality of keys used to instruct playback of the moving image video stored in the storage unit, a skip playback unit configured to play back the moving image video while skipping the moving image video at predetermined time intervals every time a predetermined operation is made on the operation unit, and a playback control unit configured to switch the time intervals skipped by the skip playback unit based on the total playback time period of the moving image video.

12 Claims, 7 Drawing Sheets

| Button/lever \ State | Rest | During playback | During pausing | During fast-forwarding | During fast-rewinding |
|---|---|---|---|---|---|
| OK | Switch display | | | | |
| OK button △ | Play | Pause | | Play | |
| OK button ▽ | Select playback method | Stop | | | |
| OK button ◁ | Previous image | One-touch replay | | - | |
| OK button ▷ | Next image | One-touch skip | | - | |
| Jog dial left | Previous image | Fast-rewinding | Frame-by-frame reverse | Play | Continue fast-rewinding |
| Jog dial right | Next image | Fast-forwarding | Frame-by-frame advance | Continue fast-forwarding | Play |
| Zoom lever T side | Chapter display | Tone volume up | | | |
| Zoom lever W side | Thumbnail display | Tone volume down | | | |

FIG. 5

VOBU_ENT information:
Having information including VOBU size as many as number of GOPs One VOBU includes information of one GOP

PLAYBACK APPARATUS

CROSS-REFERENCE TO RELATED APPLICATIONS

This application a divisional of co-pending U.S. application Ser. No. 11/514,967, filed Sep. 5, 2006, and to which priority is claimed under 35 U.S.C. §121. This application is based upon and claims the benefit of priority under 35 U.S.C. §119 from Japanese Patent Application No. 2005-271084, filed Sep. 16, 2005, the entire contents of both applications are incorporated herein by reference in their entireties.

BACKGROUND

1. Field

One embodiment of the invention relates to a capturing apparatus for capturing a still image and a moving image.

2. Description of the Related Art

In recent years, multi-functional digital apparatuses such as digital still cameras, digital video cameras, and the like have remarkably prevailed. Various proposals for improvement of the operability of such multi-functional digital apparatuses have been made. For example, Jpn. Pat. Appln. KOKAI. Publication No. 2000-115707 proposes a technique associated with playback speed control by means of the rotation angle of a dial.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a capturing apparatus comprises a capturing unit configured to capture a moving image video, a storage unit configured to store the moving image video captured by the capturing unit, an operation unit configured to include a plurality of keys used to instruct playback of the moving image video stored in the storage unit, a skip playback unit configured to play back the moving image video while skipping the moving image video at predetermined time intervals every time a predetermined operation is made on the operation unit, and a playback control unit configured to switch the time intervals skipped by the skip playback unit based on a total playback time period of the moving image video.

Figure 1:
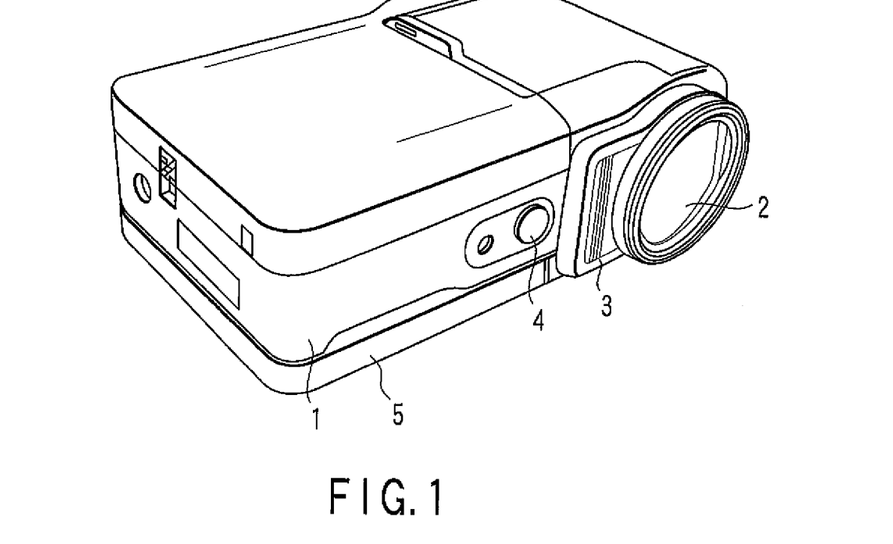
FIG. 1 is a perspective view showing a video capturing apparatus in a state in which a display unit is stored according to an embodiment of the invention.
Figure 2:
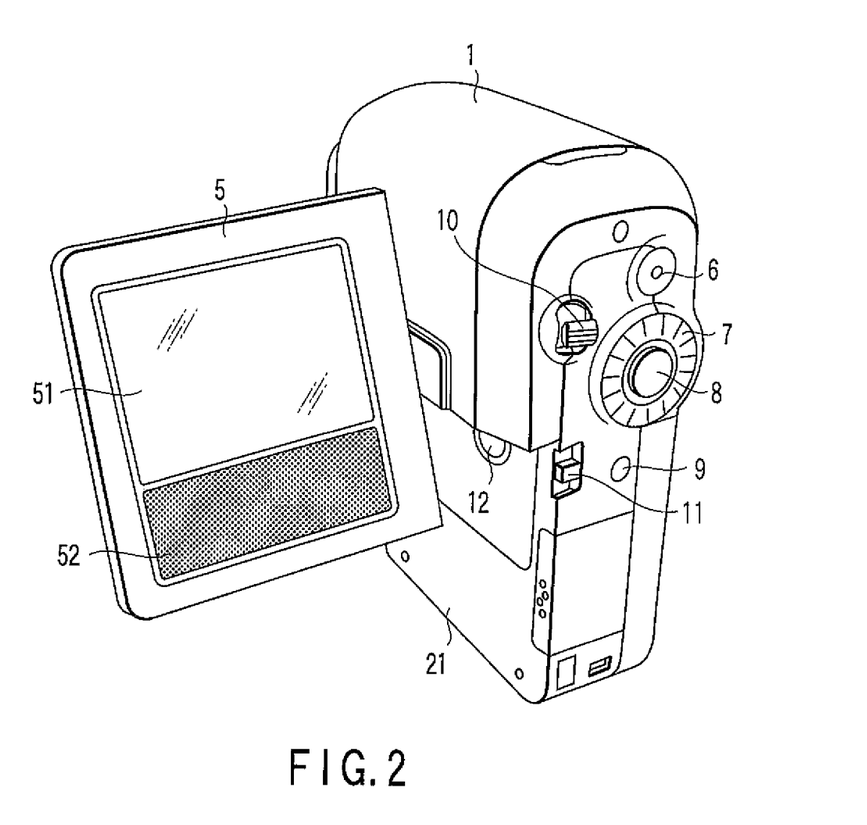
FIG. 2 is a perspective view showing the video capturing apparatus in a state in which the display unit is extracted according to the embodiment.

FIGS. 1 and 2 show an example of a video capturing apparatus according to the invention. FIG. 1 shows a state in which a display unit is stored in a storage unit provided to a main body which forms the video capturing apparatus. FIG. 2 shows a state in which the display unit is set to allow the user to watch a video displayed on it.

As shown in FIGS. 1 and 2, the video capturing apparatus comprises a main body 1. The main body 1 comprises a lens 2, electronic flash 3, still image record button 4, display unit 5, moving image record button 6, jog dial 7, arrow keys 8, menu button 9, zoom bar 10, mode lever 11, power button 12, and the like.

Furthermore, the main body 1 comprises a storage unit 21, which can store the display unit 5. The display unit 5 is configured to be movable, and can be extracted from the storage unit 21 to adjust its display screen to an arbitrary angle. The display unit 5 comprises an LCD (liquid crystal display) 51 and loudspeaker 52.

Figure 3:
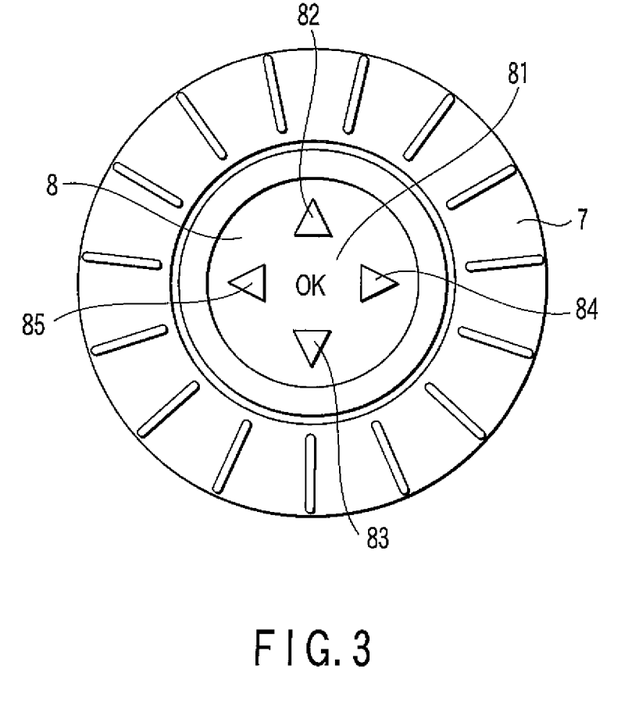
FIG. 3 is a view for explaining a jog dial and OK button of the video capturing apparatus according to the embodiment.

FIG. 3 is a view for explaining details of the jog dial and an OK button.

As shown in FIG. 3, the jog dial 7 is formed into an annular shape. This jog dial 7 is configured to be rotatable clockwise and counterclockwise. Note that the shape of the jog dial 7 is not limited to the annular shape but it may be a polygonal annular shape.

Furthermore, the circular arrow keys 8 are arranged inside the jog dial 7. The arrow keys 8 comprise an OK key 81 at the central position, an UP key 82 at the up position, a DOWN key 83 at the down position, a right key (direction key) 84 at the right position, and a left key (direction key) 85 at the left position.

Figure 4:
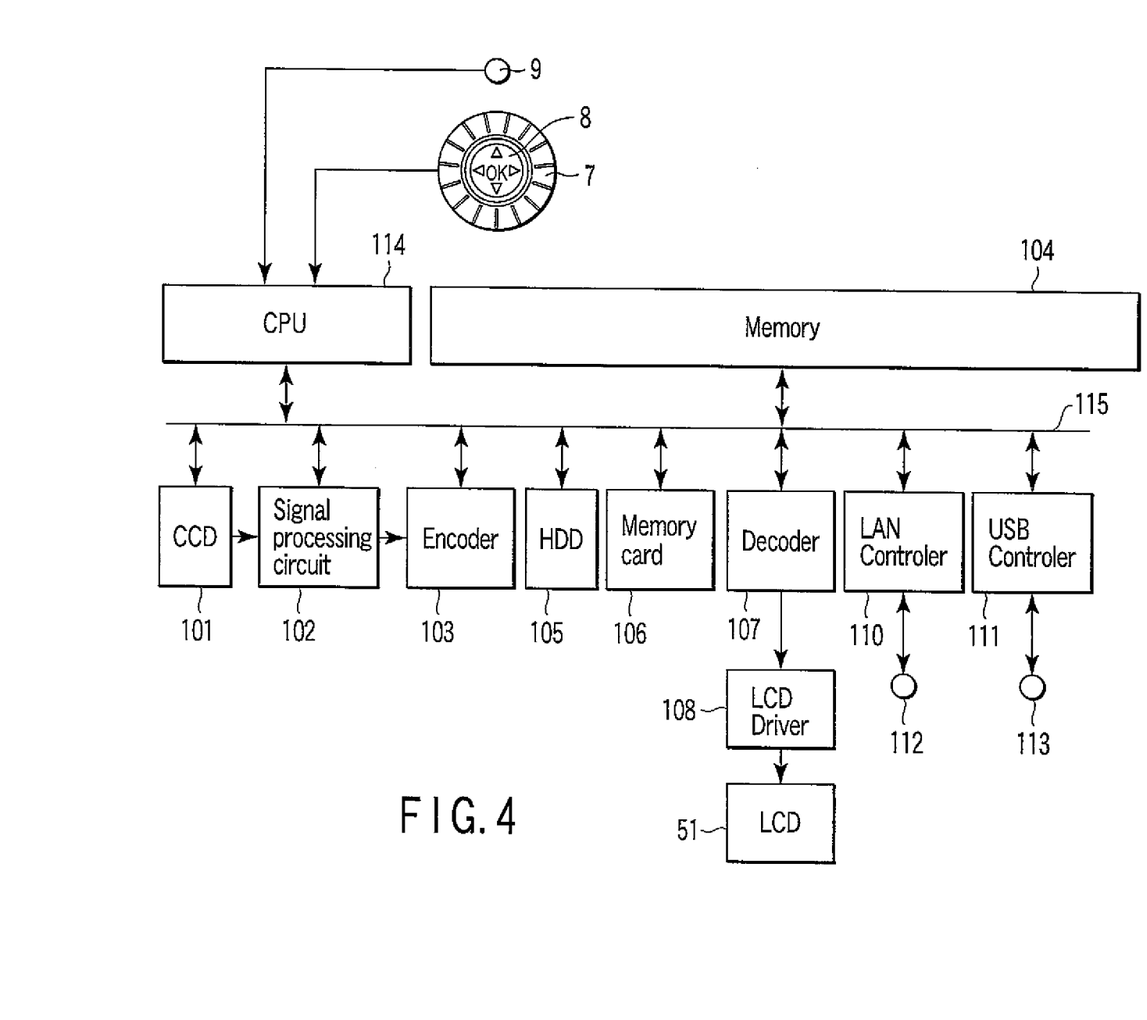
FIG. 4 is a schematic block diagram showing the arrangement of the video capturing apparatus according to the embodiment.

FIG. 4 is a schematic block diagram showing the arrangement of the video capturing apparatus that has been explained with reference to FIGS. 1 to 3.

As shown in FIG. 4, the video capturing apparatus comprises a CCD 101, a signal processing circuit 102, an encoder (JPEG/MPEG) 103, a memory 104, an HDD 105, a memory card 106, a decoder 107, an LCD driver 108, the LCD 51, a LAN controller 110, a USB controller 111, a LAN terminal 112, a USB terminal 113, a CPU 114, and the like. These components are connected via a bus 115.

In response to the operation of the still image record button 4, the CCD 101 converts light (still image) obtained via the lens 2 into an electrical signal. Or in response to the operation of the moving image record button 6, the CCD 101 converts light (moving image) obtained via the lens 2 into an electrical signal. The signal processing circuit 102 converts the electrical signal output from the CCD 101 into a digital signal. The encoder 103 encodes the digital signal of the still image into an image signal compliant to JPEG. Or the encoder 103 encodes the digital signal of the moving image into an image signal compliant to MPEG. The HDD 105 stores an image signal provided via the memory 104. The detachable memory card 106 similarly stores an image signal provided via the memory 104. The decoder 107 decodes an image signal provided via the memory. The LCD driver 108 controls to drive the LCD 51 based on the decoded image signal, and outputs the image signal onto the LCD.

Upon playback of a recorded image, the decoder 107 decodes an image signal provided from the HDD 105 or memory card 106 via the memory 104. The LCD driver 108 controls to drive the LCD 51 based on the decoded image signal, and outputs the image signal onto the LCD 51.

When an image recorded in the HDD 105 or memory card 106 is to be transferred to an external apparatus (PC or the like) or an image is received from the external apparatus, such image is exchanged from the USB terminal 113 via the USB controller 111. Also, an encoded image can be directly exchanged with an image recording and playback apparatus (e.g., DVD recorder) without the intervention of the external apparatus (PC or the like).

In general, when an image is to be transferred to a DVD recorder, an encoded moving image is decoded on the transmission side (the video capturing apparatus side), and is output as an analog signal via a video terminal or S terminal. Then, the analog is re-encoded and saved on the reception side (the moving image recording and playback apparatus side). With this method, one hour is required to record an image which was recorded for one hour on a DVD or the like.

However, this video capturing device can transfer an encoded image as streaming data intact to the image recording and playback apparatus via the network, as described above. With this data transfer, a transfer time $1/10$ or less of the real recording time can be achieved although it depends on the compression ratio upon encoding. In addition, high image quality can be maintained since the image is not re-encoded. For example, when only the transfer time about $1/10$ of the real recording time is required, a moving image which was recorded for one hour can be recorded on another recording medium in about six minutes. When a LAN is assumed as the network, image data is exchanged using the LAN terminal 112 via the LAN controller 110. Note that data to be transferred can be audio data in addition to a moving image and still image.

The playback operation will be described below with reference to FIG. 5. When a playback mode is selected by the mode lever 11, a list of playback items (e.g., thumbnails of moving images) is displayed on the display unit. The user selects a playback item using the jog dial 7, and inputs a playback start instruction using the arrow keys 8 (up key 82).

Figure 5:
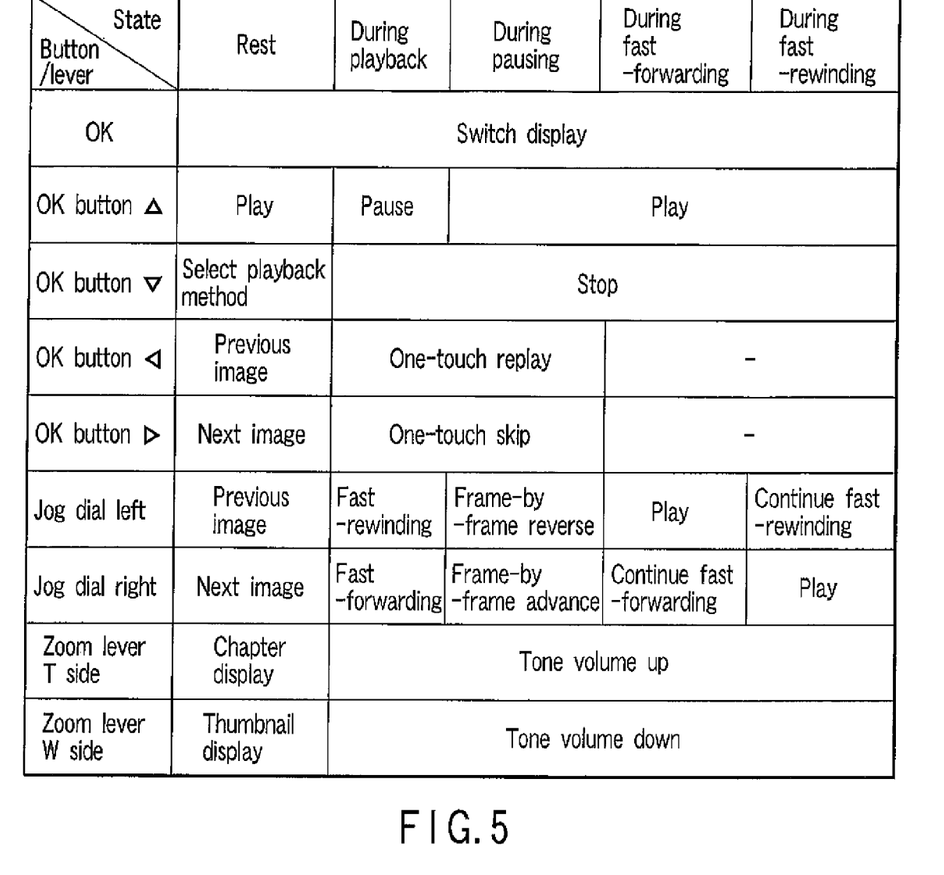
FIG. 5 is a table for explaining a plurality of playback operations according to the embodiment.

Moving image playback includes the following modes, and these playback operations are as shown in FIG. 5.

1. Normal playback (equal-speed playback)
2. Reverse Playback (equal-speed reverse playback)
3. High-speed playback faster than normal playback (fast-forwarding, one-touch skip, etc.)
4. High-speed reverse playback faster than reverse playback (fast-rewinding, one-touch replay, etc.)
5. Frame-by-frame advance playback
6. Frame-by-frame reverse playback Note that the reverse playback, high-speed playback, high-speed reverse playback, frame-by-frame advance playback, and frame-by-frame reverse playback will be generically referred to as trick playback. Since the aforementioned video capturing apparatus reads out image data from a randomly accessible medium such as the HDD 105, memory card 106, or the like, an image that the user wants to watch can be easily and quickly retrieved.

The jog dial 7 outputs information of a rotation amount (rotation angle) and rotation direction to the CPU 114, which controls the entire system, in response to its rotation. For example, the jog dial 7 outputs pulses according to a predetermined rotation angle. For example, when the jog dial 7 is rotated through n°, it outputs one pulse. The CPU 114 counts the number of pulses per unit time, and calculates a rotation angle (rotation velocity) per unit time. In this way, the CPU 114 acquires the rotation information including the rotation amount (rotation angle), rotation direction, rotation velocity, and the like of the jog dial 7 during execution of the playback mode, and controls the playback operation based on this rotation information. The arrow keys 8 inform the CPU 114 of pressing of the OK key 81 at the central position, that of the UP key 82 at the up position, that of the DOWN key 83 at the down position, that of the right key 84 at the right position, and that of the left key 85 at the left position. The CPU 114 controls the playback operation based on pressing of each key of the arrow keys 8.

As can be seen from FIG. 5, when the jog dial 7 is rotated upon moving image playback, the playback speed can be finely varied. However, upon playing back an image which was recorded for a long period of time, when a time period from an image that the user is currently watching until an image that the user wants to watch is long, a relatively long period of time is required even by highest-speed playback until the image that the user wants to watch is reached. For example, about two minutes are required even by 15×-speed playback until an image 30 minutes ahead of the image that the user is currently watching is reached. In case of high-speed playback, if the next file is a moving image file as short as several ten minutes, playback of that moving image file ends instantaneously, and playback of the next file starts unwantedly.

Hence, the CPU 114 has the following two playback control modes.

Playback control 1: The CPU 114 controls fast-forwarding or fast-rewinding playback after it controls the forwarding or rewinding amount of a video (after it switches the skip interval of a moving image video) based on the rotation angle of the jog dial 7.

Playback control 2: The CPU 114 controls fast-forwarding or fast-rewinding playback after it controls the forwarding or rewinding amount of a video (after it switches the skip interval of a moving image video) based on pressing of the right key 84 or the left key 85 of the arrow keys 8 and the playback time period of a video to be played back. For example, the CPU 114 controls to forward or rewind a video by steps 1/n (n: a natural number) the playback time period of a video for one file.

With the latter playback control, when an image which was captured for a long period of time is to be played back, if a time period from an image that the user is currently watching until an image that the user wants to watch is long, the image that the user wants to watch can be found in a short period of time. Or when an image which was captured for a long period of time is to be played back, if a time period from an image that the user is currently watching until an image that the user wants to watch is short, the image that the user wants to watch can be found without missing.

The CPU 114 may variably control the high-speed playback speed of the jog dial 7 based on the playback time of a moving image file. For example, with the variable control of the high-speed playback speed by the CPU 114, the high-speed playback speed of a moving image file less than a predetermined time period (e.g., a moving image file as short as several ten seconds) is relatively low, and that of a moving image file equal to or longer than the predetermined time period is relatively high.

Figure 6:
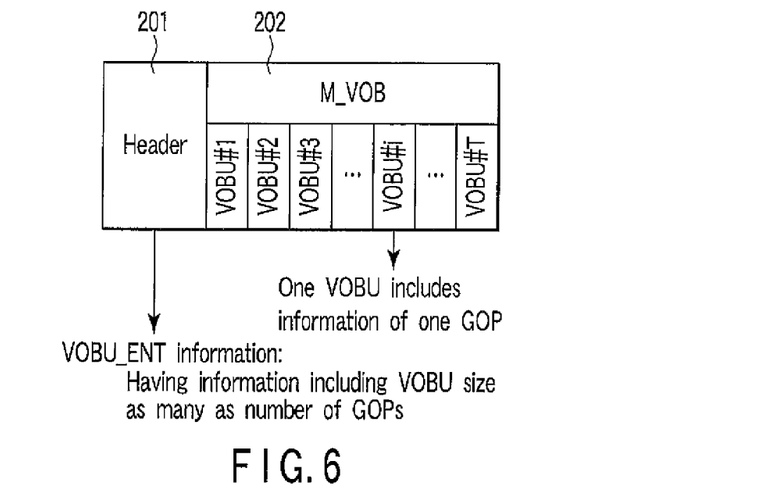
FIG. 6 is a view showing the data structure of one MPEG moving image file.

FIG. 6 shows an example of the data structure of one MPEG moving image file. The MPEG moving image file includes a header 201 and a video object 202. The header 201 includes information associated with the video object 202. The video object 202 includes a plurality of VOBUs (Video Object Units) each having data compressed by MPEG. The number of VOBUs is proportional to the capturing time. One VOBU has compressed captured data for 0.5 sec, i.e., one GOP (Group Of Picture) and many pieces of header information. For example, for capturing for 10 minutes, 10 minutes× 60 seconds/0.5=1200 GOPs are generated. The header 201 includes VOBU_ENT information, which records the sizes of respective VOBUs. For example, the header 201 of the video object 202 including 1200 GOPs records size information for each of 1200 GOPs.

Figure 7:
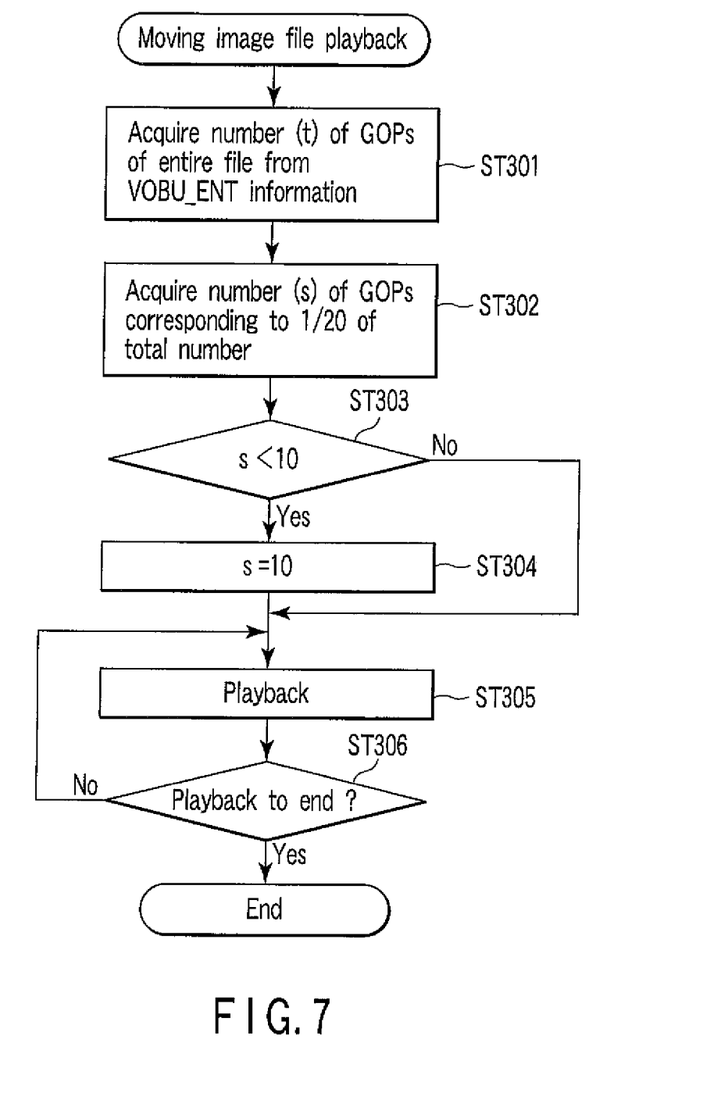
FIG. 7 is a flowchart showing playback control according to the embodiment.
Figure 9:
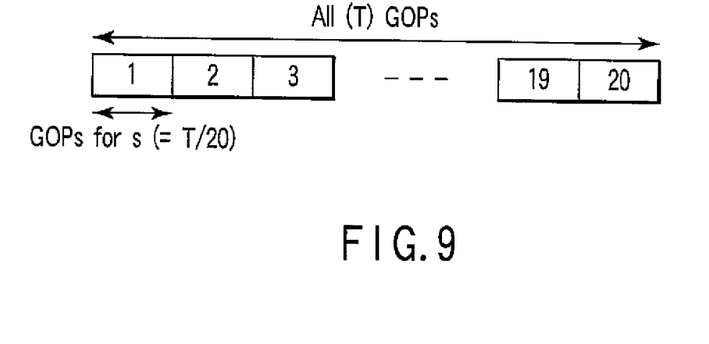
FIG. 9 is a view for explaining the number of GOPs when the length of a file is divided into 1/20 according to the embodiment.

FIG. 7 is a flowchart showing the playback control by the CPU 114. Initially, the number (T) of GOPs of the entire file is acquired from the VOBU_ENT information (ST301). The number (s=T/20) of GOPs is acquired by equally dividing the entire file by 20 (n=20) (ST302). FIG. 9 shows the number of GOPs when the file length is divided into 1/20. At this time, when the capturing time is as short as 200 sec or less, s=10 is fixed, or s is increased with decreasing capturing time (ST303, ST304). That is, upon playback of a short file, if this file is skipped at time intervals 1/20 of this file, the skip interval becomes very short, resulting in an inconvenient function. The high-speed playback by means of the jog dial 7 is faster. Hence, upon playback of a short file (a file whose playback time period is less than a predetermined time period), s is fixed or s is increased with decreasing file length, and that file is played back to the end (ST305, ST306). In this manner, this function can be conveniently used.

Figure 8:
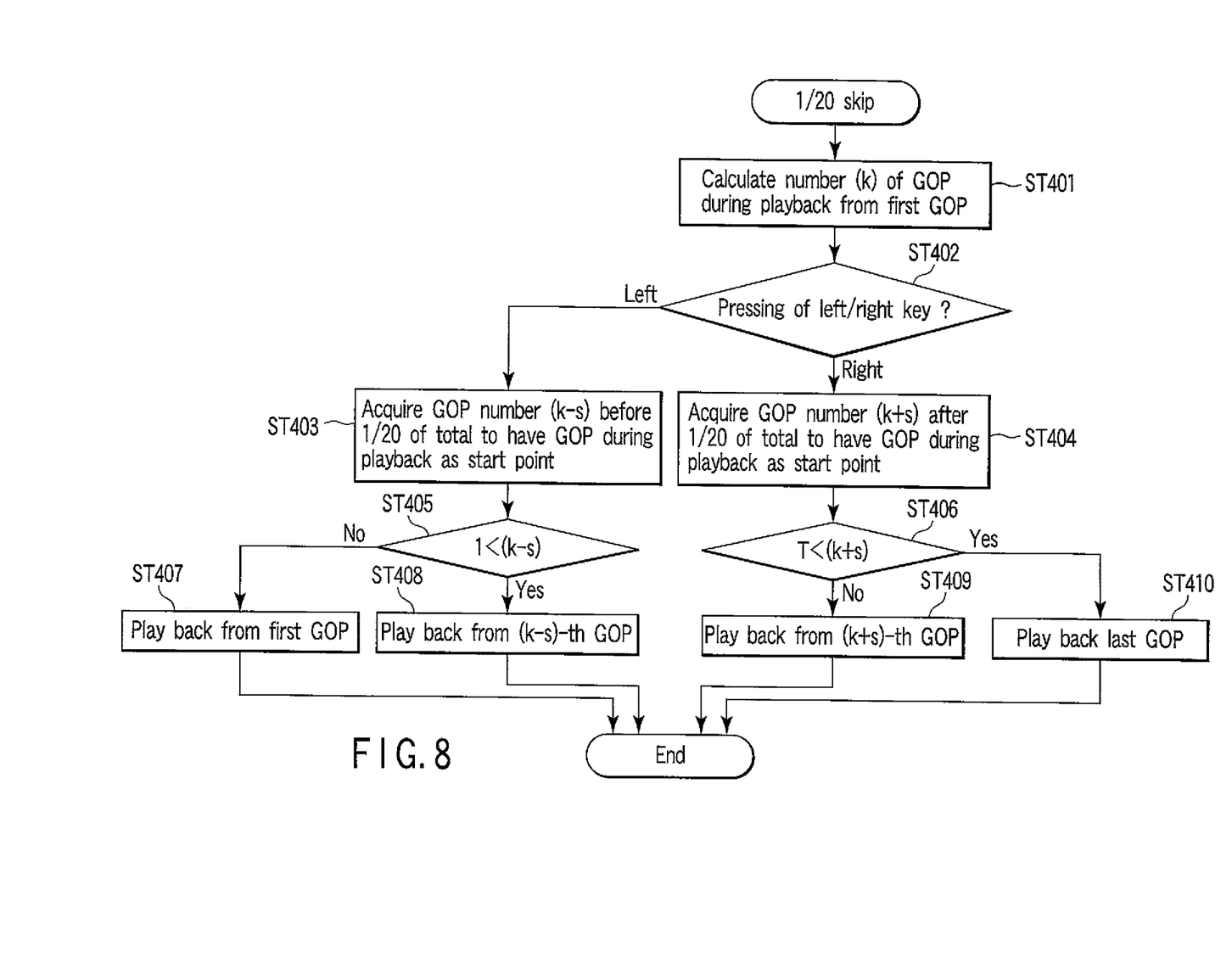
FIG. 8 is a flowchart showing 1/20 skip playback control according to the embodiment.
Figure 10:
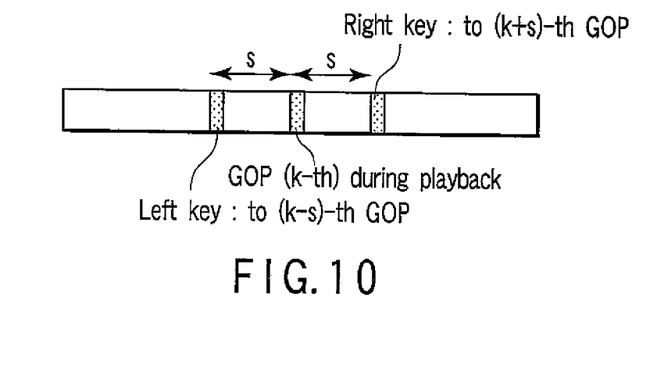
FIG. 10 is a view for explaining a skip destination (GOP position) for an operation input by a right key or left key according to the embodiment.

FIG. 8 is a flowchart showing the 1/n (n: a natural number, e.g., n=20) skip playback control by the CPU 114. Note that upon playback of a short file (a file whose playback time period is less than the predetermined time period), 1/m (m: a natural number, m<n) skip playback control is executed since s is fixed or s is increased with decreasing file length, as described above. This playback control is executed in response to an operation input of the right key 84 or the left key 85 of the arrow keys 8. The number of the GOP which is being played back from the first. GOP is calculated. A time is acquired from the decoded time code of MPEG, and the number of the current GOP can be calculated based on 1 GOP=0.5 s. Assume that the current. GOP is the k-th GOP (ST401). If the operation input of the left key 85 is detected, rewinding is executed (ST402, left); if that of the right key 84 is detected, forwarding is executed (ST402, right). In case of rewinding, the k-th GOP is skipped to the (k−s)-th GOP; in case of forwarding, it is skipped to the (k+s)-th GOP (ST403, ST404). However, if k−1 is 1 or less in case of rewinding, the k-th GOP is skipped to the first GOP; if k+s is larger than the total number T of GOPs in case of forwarding, the k-th GOP is skipped to the last GOP (ST405, ST406). That is, the 1/20 skip playback is controlled to have the last or first GOP of the video as a limit. If the number of the GOP to be skipped from the first GOP is determined, its position is acquired from the VOSU_ENT information shown in FIG. 6, and an image is skipped to that position (ST407, ST408, ST409, ST410). FIG. 10 shows a skip destination (GOP position) in response to the operation input of the right key 84 or the left key 85.

Note that this 1/20 skip is also effective for trick playback such as reverse playback, high-speed playback, high-speed reverse playback, frame-by-frame advance playback, frame-by-frame reverse playback, and the like. Furthermore, when the right key 84 or the left key 85 is kept pressed, forwarding or rewinding is continuously done by 1/20.

Figure 11:
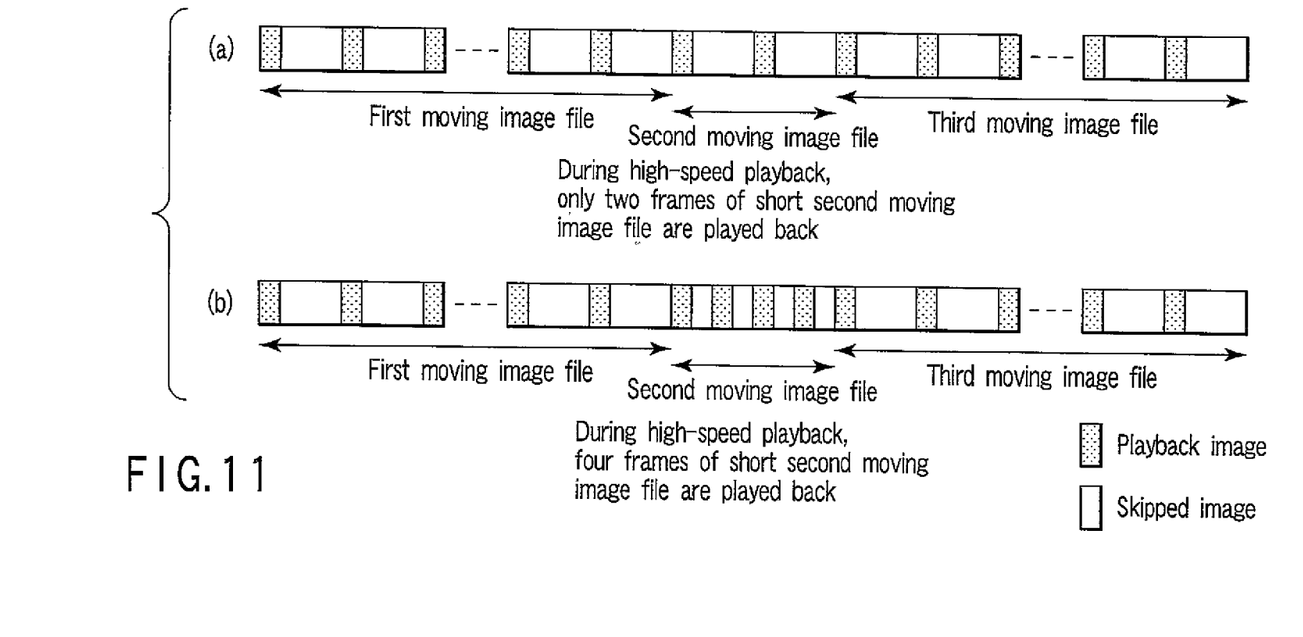
FIG. 11 is a view for explaining playback control depending on the file length to prevent playback of a moving image file as short as about several ten seconds from instantaneously ending during high-speed playback based on the rotation angle of the jog dial according to the embodiment.

Another embodiment will be described below with reference to FIG. 11. FIG. 11 is views for explaining playback control depending on the file length to prevent playback of a moving image file as short as about several ten seconds from instantaneously ending during high-speed playback based on the rotation angle of the jog dial 7. As shown in FIG. 11, assume that a second file is as short as ten-odd seconds while high-speed playback of first, second, and third files is continuously done. When the playback control according to the file length is not applied, only several frames (two frames in this example) of the second file are played back, as shown in (a) of FIG. 11. By contrast, when the playback control according to the file length is applied, the playback speed of the short file can be decreased. As a result, more frames (four frames in this example) of the second file can be played back, as shown in (b) of FIG. 11. That is, the total captured time is detected from the VOBU_ENT information shown in FIG. 6, and if a short moving image file is detected, the high-speed playback speed is fixed to a low speed without exception or is decreased with increasing file length. That is, the CPU 114 controls fast-forwarding or fast-rewinding playback after it controls the forwarding or rewinding amount of a video based on the rotation angle of the jog dial 7 the playback time period of a video to be played back.

With the above control, the following operation effects can be obtained.

In case of high-speed fast-forwarding or high-speed fast-rewinding (e.g., 15×-speed), a longer time period is required to reach a scene that the user wants to watch with increasing playback time period of a moving image. Likewise, in case of high-speed fast-forwarding or high-speed fast-rewinding (e.g., 15×-speed), the user is more likely to miss a scene that he or she wants to watch with decreasing playback time period of a moving image. According to the invention, fast-forwarding or fast-rewinding can be done at 1/n steps of the playback time period of the moving image irrespective of the playback time period of the moving image, and a time period required to reach a scene that the user wants to watch can be shortened. Furthermore, as for a short moving image, the high-speed playback speed by means of the jog dial 7 can be decreased. As a result, adequate high-speed playback with high visibility can be provided.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims, and their equivalents are intended to cover such forms or modification as would fall within the scope and spirit of the inventions.

What is claimed is:

1. A playback apparatus comprising:
    an operation unit configured to include a plurality of keys used to instruct playback of the moving image video;
    a skip playback unit configured to play back the moving image video while skipping the moving image video at predetermined time intervals every time a predetermined operation is made on the operation unit; and a playback control unit configured to switch the time intervals skipped by the skip playback unit based on a total playback time period of the moving image video.

2. The apparatus according to claim 1, wherein the operation unit comprises a dial key and arrow keys used to play back the moving image video while skipping the moving image video at the predetermined time intervals, and the playback control unit switches the time intervals skipped by the skip playback unit based on a rotation angle of the dial key, and switches the time intervals skipped by the skip playback unit based on pressing of one of the arrow keys and the total playback time period of the moving image video.

3. The apparatus according to claim 1, wherein the playback control unit switches the time intervals skipped by the skip playback unit at 1/n (n: a natural number) intervals of the total playback time period of the moving image video.

4. The apparatus according to claim 1, wherein the playback control unit switches the time intervals skipped by the skip playback unit at 1/n (n: a natural number) intervals of the total playback time period of the moving image video with reference to a current playback position.

5. The apparatus according to claim 3, wherein the playback control unit switches the time intervals skipped by the skip playback unit at 1/m (m: a natural number, m<n) intervals of the total playback time period of the moving image video based on the fact that the total playback time period of the moving image video is less than a predetermined time period.

6. The apparatus according to claim 3, wherein the playback control unit switches the time intervals skipped by the skip playback unit at 1/m (m: a natural number, m<n) intervals of the total playback time period of the moving image video with reference to a current playback position based on the fact that the total playback time period of the moving image video is less than a predetermined time period.

7. The apparatus according to claim 1, wherein the operation unit inputs an equal-speed reverse playback instruction, and the playback control unit controls equal-speed reverse playback of the moving image video based on the equal-speed reverse playback instruction of the operation unit, and switches the time intervals skipped by the skip playback unit at 1/n (n: a natural number) intervals of the total playback time period of the moving image video based on a predetermined interval skip playback instruction of the operation unit during the equal-speed reverse playback.

8. The apparatus according to claim 1, wherein the operation unit inputs a pause instruction, and the playback control unit controls pause of playback of the moving image video based on the pause instruction of the operation unit, and switches the time intervals skipped by the skip playback unit at 1/n (n: a natural number) intervals of the total playback time period of the moving image video based on a predetermined interval skip playback instruction of the operation unit during pausing.

9. The apparatus according to claim 1, wherein the operation unit inputs a frame-by-frame advance playback instruction, and the playback control unit controls frame-by-frame advance playback of the moving image video based on the frame-by-frame advance playback instruction of the operation unit, and switches the time intervals skipped by the skip playback unit at 1/n (n: a natural number) intervals of the total playback time period of the moving image video based on a predetermined interval skip playback instruction of the operation unit during the frame-by-frame advance playback.

10. The apparatus according to claim 1, wherein the playback control unit switches the time intervals skipped by the skip playback unit at 1/n (n: a natural number) intervals of the total playback time period of the moving image video based on a predetermined interval skip playback instruction of the operation unit to have the last or head of the moving image video as a limit.

11. The apparatus according to claim 1, wherein the playback control unit continuously switches the time intervals skipped by the skip playback unit at 1/n (n: a natural number) intervals of the total playback time period of the moving image video based on a predetermined interval skip playback continuous instruction of the operation unit.

12. A playback apparatus comprising:

an operation unit configured to include a plurality of keys used to instruct playback of the moving image video;

a skip playback unit configured to play back the moving image video while skipping the moving image video at predetermined time intervals every time a predetermined operation is made on the operation unit; and a playback control unit configured to switch the time intervals skipped by the skip playback unit based on a total playback time period of the moving image video, wherein the operation unit includes a dial key used to play back the moving image video while skipping the moving image video at predetermined time intervals, and the playback control unit switches the time intervals skipped by the skip playback unit based on a rotation angle of the dial key and the total playback time period of the moving image video.

\* \* \* \* \*